United States Patent [19]

Kawata et al.

[11] Patent Number: 4,592,046
[45] Date of Patent: May 27, 1986

[54] SUBSCRIBER'S CIRCUIT FOR TIME DIVISION SWITCHING SYSTEM

[75] Inventors: Yoshihiro Kawata, Saitama; Tsunetaka Sakata, Hachioji; Teruo Matsufuji, Koganei; Tetsuro Inomata, Kawasaki; Hiroyuki Miyashita, Koganei, all of Japan

[73] Assignee: Iwasaki Tsushinki Kabushiki Kaisha, Tokyo, Japan

[21] Appl. No.: 595,668

[22] Filed: Apr. 2, 1984

[30] Foreign Application Priority Data

Mar. 13, 1983 [JP] Japan ................... 58-55628
Apr. 1, 1983 [JP] Japan ................... 58-57035

[51] Int. Cl.$^4$ .................. H04Q 11/04; H04J 3/12; H04M 3/00; H04M 1/00
[52] U.S. Cl. .................. 370/58; 370/110.1; 179/18 AB; 179/81 R
[58] Field of Search .......... 179/18 AB, 18 FG, 81 R; 370/110.1, 58

[56] References Cited

U.S. PATENT DOCUMENTS

| | | | |
|---|---|---|---|
| 3,939,311 | 2/1976 | Smith | 179/81 R |
| 4,081,619 | 3/1978 | Losehand | 179/81 R |
| 4,135,061 | 1/1979 | Pincemin | 179/18 AB |
| 4,232,293 | 11/1980 | Harris | 179/81 R |
| 4,345,115 | 8/1982 | Sweet | 179/81 R |

FOREIGN PATENT DOCUMENTS 8103728 12/1981 PCT Int'l Appl. ............... 179/81 R

OTHER PUBLICATIONS

W. D. Pace, "LSI for Telecommunications", Telecommunications, Apr. 1984, pp. 43-48.

Primary Examiner—Douglas W. Olms
Assistant Examiner—Wellington Chin
Attorney, Agent, or Firm—Robert E. Burns; Emmanuel J. Lobato; Bruce L. Adams

[57] ABSTRACT

A click tone removing system for a time division switching system which performs switching of speech channels by a highway switch inserted in a highway. When a hook information detector and a dial information detector detect hook information and a dial information, respectively, delivery of a PCM speech sending signal to the highway is prevented by a blocking function for a fixed period of time, so that the highway is controlled to switch the speech channel, thereby removing a click tone generated by dialing. A subscriber's circuit of an exchange, which changes over a speech sending highway and a speech receiving highway by means of a highway switch, is characterized by the provision of an A/D converter for digitizing a speech sending signal to a digitized speech sending signal sent out to the speech sending highway, a D/A converter for converting a digitized speech receiving signal applied from the speech receiving highway into an analog signal, a gate for gating the input signal to the D/A converter, and a control circuit for controlling the gate, so that during real time processing the speech receiving signal highway is interrupted by opening and closing the gate without controlling the higway switch.

2 Claims, 9 Drawing Figures

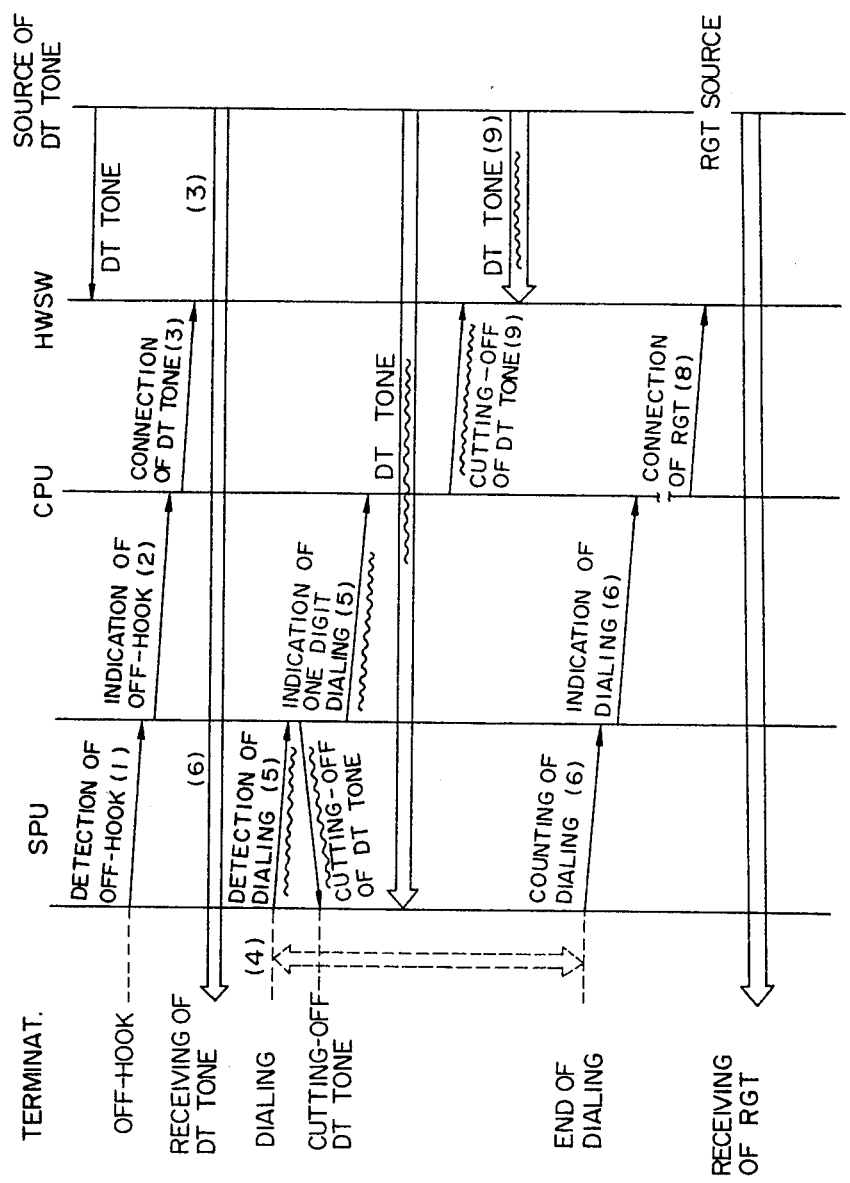

4,592,046

SUBSCRIBER'S CIRCUIT FOR TIME DIVISION SWITCHING SYSTEM

BACKGROUND OF THE INVENTION

The present invention relates to a subscriber's circuit which controls a speech signal in a time division digital exchange, that is, a time division switching system which performs switching of speech channels by a highway switch inserted in a highway.

In a switching system of the type, a processor periodically scans subscriber's circuits to detect hook information and dial information. In this case, control commonly referred to as channel control is mostly carried out at a relatively low speed. However, since this periodic scanning calls for real time processing, the control operations are performed for each level of control. This tends to make the control operations complicated. Especially in recent years, a system based on a stored program control system using a microprocessor or the like has come into wide use, so that the system is now being enhanced in function. At present, the actual complication of control exceeds the progress of the capabilities of the microprocessor.

In the above switching system, a click dial tone is leaked out at the start of a dialing operation.

To avoid this, it is necessary to introduce a special high-speed routine in the operation of software control, making the control operations more complex than ever.

In recent years, the microprocessor technology has come into use for four-wire switching system, and a stored program control system has prevailed as its control system. In general, control of the exchange includes an operation which must be controlled at a high speed and in real time, such as the detection of hook information and dial information, and an operation which may be carried out at a low speed, such as call processing control. On account of this, the stored program control employing the microprocessor usually utilizes level of control, and hence multi-levels of control. This makes the control of the exchange equipment extremely complicated and inflexible. Further, the complexity of exchange equipment the function of which is enhanced more and more, such as a key telephone system, exceeds the progress of the capabilities of the microprocessor.

With such a background, the microprocessor technology is now attracting attention in the persuit of simplification and flexibility (extendability) of software.

In the above four-wire switching systems, while a short duration of dial tone is also leaked out at the start of a dial operation, this problem has not yet been resolved by simple and economical circuitry or software.

SUMMARY OF THE INVENTION

It is an object of the present invention to provide a subscriber's circuit for a time division switching system in which a scan processor is provided in correspondence to each line or each group of a plurality of lines for performing all real time processing, thereby solving the removal of click tones without the complication of control operations.

It is another object of the present invention to provide a subscriber's circuit for a time division switching system adapted so that the ciritical path portion in terms of speed is supplemented by the addition of a small quantity of hardware to readily suppress click dial tones.

In accordance with the present invention, there is provided a subscriber's circuit for a time division switching system which performs switching of speech channels by a highway switch inserted in a highway. When a hook information detector and a dial information detector detect hook information and dial information, respectively, delivery of a PCM speech transmission sending signal to the highway is prevented by a blocking function for a fixed period of time, so that the highway is controlled to switch the speech channel, thereby removing a click tone generated by dialling. A subscriber's circuit of an exchange, which changes over a speech transmission or sending highway and a speech receiving highway by means of a highway switch, is provided by the provision of an A/D converter for digitizing a speech sending signal to a digitized speech sending signal sent out to the speech sending highway, a D/A converter for converting a digitized speech receiving signal applied from the speech receiving highway into an analog signal, a gate for gating the input signal to the D/A converter, and a control circuit for controlling the gate, so that during real time processing the speech receiving signal highway is interrupted by opening and closing the gate without controlling the highway switch.

BRIEF DESCRIPTION OF THE ACCOMPANYING DRAWINGS

The present invention will be described in detail below in comparison with the conventional art with reference to the accompanying drawings, in which:

FIG. 9 is a flowchart showing the operation of the present invention.

DETAILED DESCRIPTION

Figure 1:
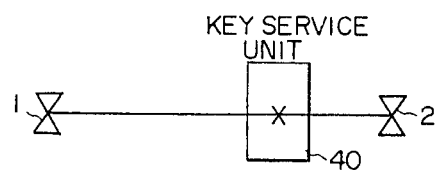
FIGS. 1 and 2 are block diagrams explanatory of an example of conventional subscriber's circuit.
Figure 2:
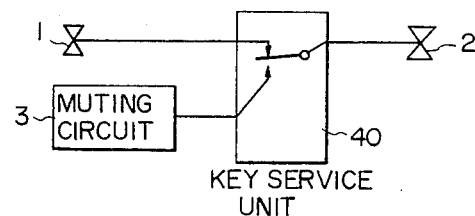

For instance, in such a call-connection state as shown in FIG. 1, it is necessary to effect control operations so that a click tone by dialing (i) for transferring the call from an inter-communication subscriber 1 to another intercommunication subscriber through a key service unit may not be leaked out to a CO line 2. Such control operation must be carried out at a high speed but, in case of effecting the control operations by software, a portion which performs the lowest-speed operation of a speech channel undertakes such control operation, and connects the CO line 2, for example, to a muting circuit 3, as shown in FIG. 2, for the period of time during which the click tone is generated. Because of the low speed, however, this operation does not take place precisely within a required time period, resulting in leakage of the click tone.

The present invention will hereinafter be described in detail.

Figure 3:
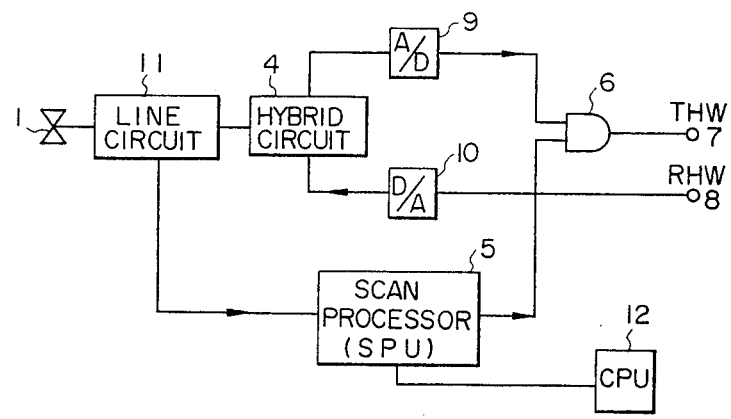
FIG. 3 is a block diagram illustrating an embodiment of the present invention.

FIG. 3 illustrates an embodiment of the present invention. Reference numeral 1 indicates a telephone set;

4 designates a hybrid circuit; 5 identifies a scan processor; 6 denotes and AND gate; 7 represents a transmitting highway (THW); 8 shows a receiving highway (RHW); 9 refers to an A/D converter; 10 signifies a D/A converter; 11 indicates a line circuit; and 12 designates a central processor (CPU).

Figure 4:
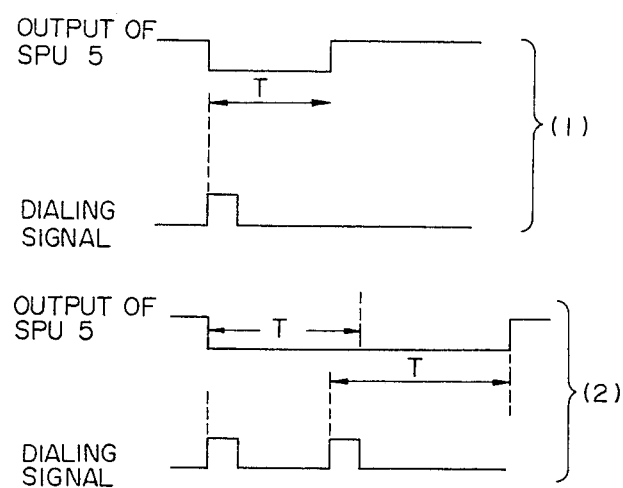
FIGS. 4 and 5 are a timing chart and an operation flowchart explanatory of the operation of the embodiment shown in FIG. 3.

This embodiment is comprised of two hierarchies of the scan processor 5, which undertakes only real time scanning under decentralized control of a microprocessor, and the central processor 12 which performs channel control. The operations will be described in respect to FIG. 4. The line circuit 11 detects hook information and dial information of the telephone set 1, and the scan processor 5 monitors these information in a very short period and, when reading-in the information, generates for a time T such an output as shown in FIG. 4 (iii). The time T is selected to be longer than the period of dial pulses. The scan processor is the retrigger type and, when one dial pulse is applied thereinto, detects it and produces such a pulse as depicted in FIG. 4 (1). Upon application of another dial pulse, it outputs again such a pulse as shown in FIG. 4 (2) only for the time T starting at that timing. With such an arrangement, the output of the scan processor 5 and a speech signal converted by the A/D converter 9 into digital form are applied to the AND circuit 6, by which the dial pulses of the intercommunication telephone set 1 are completely masked from the transmitting hightway 7 (iv), and hence they can be prevented from leaking as a sending speech signal. After the elapse of the time T, any speech sending is enabled (v).

For performing the abovesaid function alone, it is sufficient to employ a retrigger type monostable multivibrator as the scan processor 5.

Figure 5:
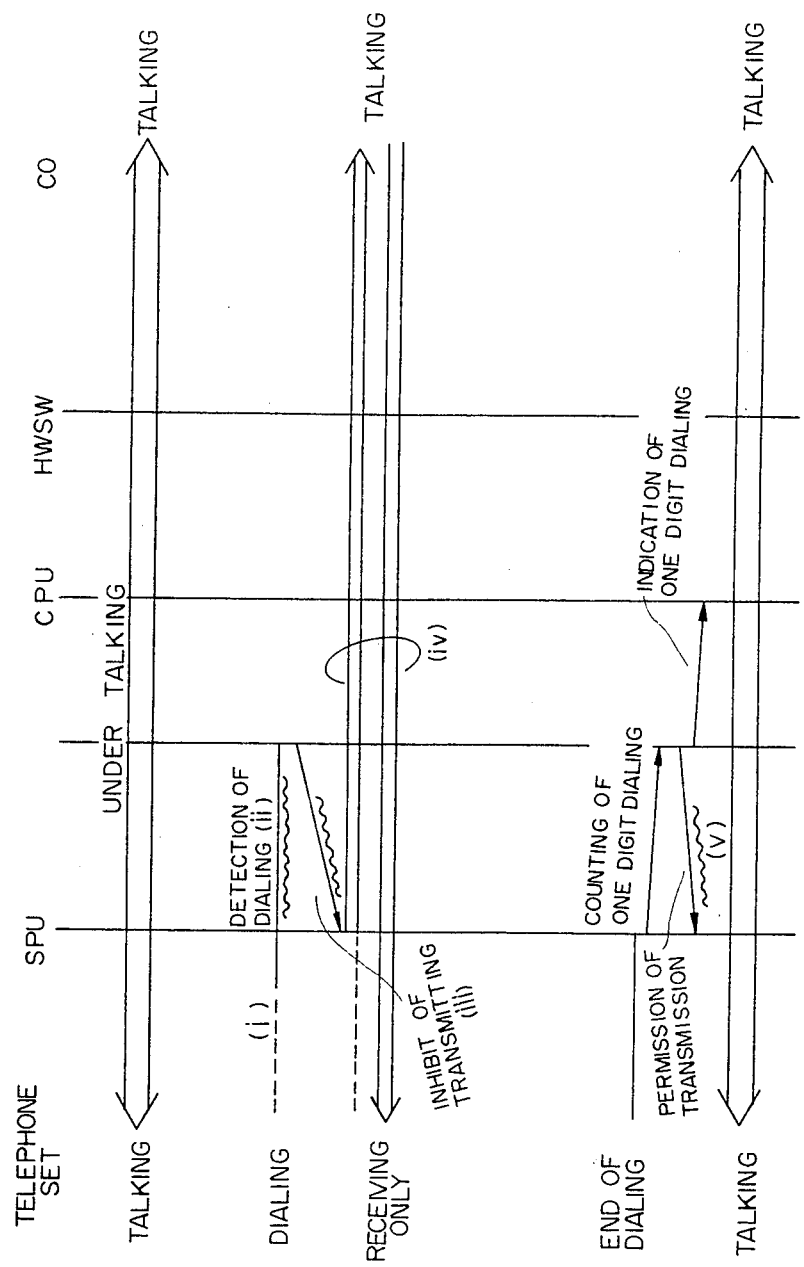

FIG. 5 is a flowchart showing, by way of example, the operations of the system of the present invention, in which references (i), (ii), (iii), (iv) and (v) correspond to the abovesaid operations indicated by the same reference numerals.

As has been described in the foregoing, the present invention can be achieved through using very simple hardware, and hence reduces the work of software and is very effective in the art.

Another application of the present invention will be described below.

In this case, there are two kinds of the function distribution type and the load distribution type but, in view of such circumstances as mentioned above, it is natural to employ a processor for a part which calls for real time control [which processor will hereinafter be referred to as a scan processor (SPU)] and a processor for a part which performs call processing control [which processor will hereinafter be referred to as a central processor (CPU)].

Figure 6:
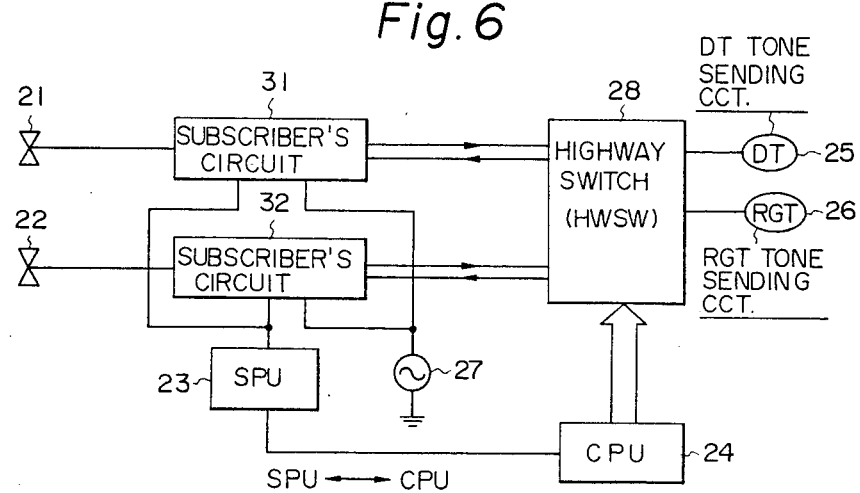
FIG. 6 is a block diagram explanatory of a conventional four-wire exchange.

Thus one possible arrangement is such as shown in FIG. 6 in which the scan processor 23 and central processor 24 are employed. A description of the operational principle of this system. The state of a call from a telephone set 21 to another telephone set 22 is achieved by such control operations as follows:

(1) The scan processor 23 detects the off-hook state of the telephone set 21.

(2) The scan processor 23 notifies the CPU 24 status of the off-hook of the telephone set 21.

(3) The CPU 24 controls a highway switch 28 to set a channel so that the telephone set 21 may receive a dial tone (DT) 25.

(4) The telephone set 21 performs a dialing operation.

(5) Upon detection of the dialing operation of the telephone set 21, the SPU 23 immediately notifies the CPU 24 of the dialing and requests it to control the highway to remove the dial tone 25.

(6) The SPU 23 counts the dial signal of the telephone set 21 and notifies the CPU 24 of the received dial signal.

(7) The CPU 24 analyzes the received dial signal and instructs the SPU 23 so that the telephone set 22 receives and audible ringing signal 27.

(8) At the same time, the highway switch 28 is controlled so that the telephone set 21 receives a ring back tone (RGT) 26, setting a channel.

The operations further continue but, nothing the operations and control contents of the SPU 23 and CPU 24 in the above, the operations (1), (5) and (6) must be performed in the real time and, for the other operations, no problem occurs even if the CPU 24 operates at a relatively low speed. In the operations (1), (5) and (6), however, the operations (1) and (6) are ordinary scanning operations and, accordingly, it is sufficient to scan subscriber's circuits at a speed which permits the reception of the dial signal, for instance, with a period of 8 millisec. However, in the operation (5), the transmission between the scan processor 23 and the CPU 24 cannot be carried out at a high speed. The reason for this is that the CPU 24 is used primarily for the low-speed call processing. For performing the transmission at a high speed, an interruption or like means would be employed but this will disturb the simple and smooth transmission of communications between the CPU 24 and SPU 23. If this part cannot be controlled at a high speed, there would be the possibility, in the actual use, that although a first digit of the dial signal is operated, the removal of the dial tone delays according to the state of operation of the CPU 24. Thus, the switching operations are often accompanied by serious difficulty even in accomplishing a seemingly unimportant object.

Such difficulty was encountered in the multiprocessor control for the first time and, in single processor control, even if the simplicity of transmission is disturbed, it is specifically dealt with as a problem of software.

Figure 7:
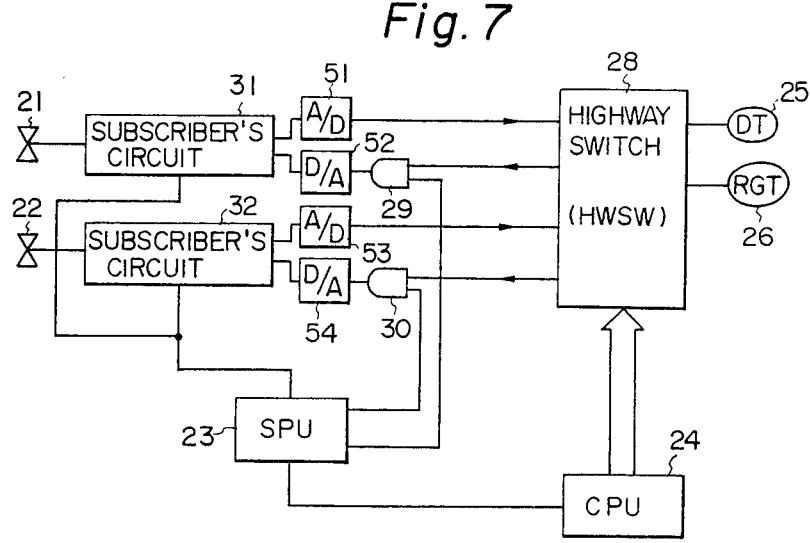
FIG. 7 is a block diagram illustrating an embodiment of the present invention.

FIG. 7 illustrates another embodiment of the present invention proposed inconnection with the second object thereof. Reference numerals 21 and 22 indicate telephone sets; 23 designates a scan processor; 24 identifies a central processor; 25 denotes a DT tone sending circuit; 26 represents an RGT tone sending circuit; 28 shows a highway switch; 29 and 30 refer to AND gates; 31 and 32 signify subscriber's circuits; A/D indicates and A/D converter; and D/A designates a D/A converter. In the embodiment of FIG. 7, the present invention is applied to the signal transmission between the scan processor 23 and the CPU 24 described previosuly in the operation (5).

Figure 8:
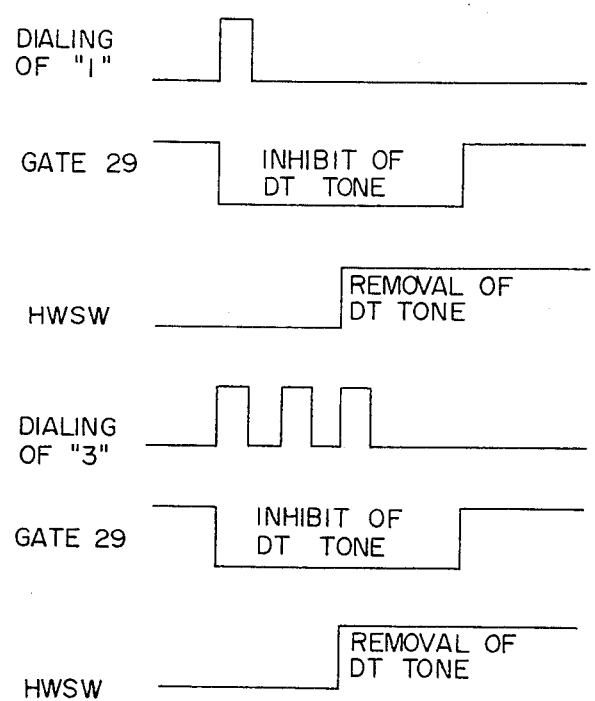
FIG. 8 is a timing chart explanatory of the operation of the present invention.

That is, interruption of the dial tone is not carried out by changeover (operation (9)) of the highway switch 28 but, by the addition of the speech receiving gates 29 and 30 placed under control of the scan processor 23, a receiving speech tone (the DT tone in this case) is prevented. With such an arrangement, the CPU 24 follows its usual method of operation to control the highway switch 28, permitting the removal of the DT tone from the DT tone sending circuit 25. FIG. 8 shows this relation on the time axis.

In general, a problem for the real time operation is that a mechanism for performing the high-speed function includes a part which is operable only at a low speed. In case of the switching operations, in view of the fact that such a part is mostly the highway switch 28 placed under control of the channel controller or the CPU 24, it is significant to prepare another hardware as means for cutting off the speed path. Another embodiment of the present invention is based on this concept.

FIG. 9 is a flowchart showing the operation of the subscriber's circuit of the present invention; in particular, the operations indicated by the way underlines are related to the present invention. Reference numerals are the same as the numbers indicating the order of operations and those used in explaining the present invention.

As has been described in the foregoing, the present invention easily solves many difficulties by the addition of a very small amount of hardware, and hence is of great utility.

We claim:

1. A subscriber's circuit for a time division switching system which performs switching of speech channels by a highway switch inserted in a highway, comprising:

hook information detecting means for detecting hook information, dial information detecting means for detecting dial information, blocking means connected to said hook information detecting means for blocking a speech sending signal digitalized in a PCM format, and control means provided so as to connect to said highway switch, said hook information detecting means said dial information detecting means and said blocking means so that when the hook information detecting means and the dial information detecting means detect the hook information and the dial information, respectively, delivery of the PCM speech sending signal to the hgihway is prevented by the blocking means for a fixed period of time, and so that the highway is controlled to switch the speech channel, thereby removing a click tone generated by dialing.

2. A subscriber's circuit for a time division switching system which changes over a speech sending highway and a speech receiving highway by means of a highway switch, comprising A/D converting means in said speech sending highway for digitizing a speech sending signal of the subscriber's circuit to a digitized speech sending signal to the speech sending highway, D/A converting means in said speech receiving highway for converting a digitized speech receiving signal applied from the speech receiving highway into an analog signal applied to said subscriber's circuit, gate means in said speech receiving highway for gating said digitized speech receiving signal, and control means connected to said subscriber's circuit and said gate means for controlling the gate means, so that during real time processing the speech receiving signal highway is interrupted by opening and closing the gate means without controlling the highway switch.

* * * * *